United States Patent [19]

Reynertson et al.

[11] Patent Number: 4,759,225
[45] Date of Patent: Jul. 26, 1988

[54] TORQUE TOOL AND TORQUE TOOL ANALYZER

[75] Inventors: John L. Reynertson, Lincolnshire; Raymond J. Blattner, Palos Hills, both of Ill.

[73] Assignee: Ryeson Corporation, Franklin Park, Ill.

[21] Appl. No.: 56,519

[22] Filed: Jun. 1, 1987

[51] Int. Cl.⁴ .................. G01L 5/24; G01L 25/00; B25B 23/14
[52] U.S. Cl. .................. 73/862.21; 73/862.22; 73/1 C; 81/479
[58] Field of Search .............. 73/1 C, 862.21, 862.22, 73/862.08; 81/479

[56] References Cited

U.S. PATENT DOCUMENTS

| | | | |
|---|---|---|---|
| 2,411,931 | 12/1946 | McVey | 73/1 C |
| 2,503,649 | 4/1950 | Zimmerman | 73/1 C |
| 2,849,879 | 9/1958 | Schiller | 73/862.01 X |
| 2,955,454 | 10/1960 | Husher | 73/1 C |
| 2,978,898 | 4/1961 | Skidmore | 73/1 C |
| 3,153,930 | 10/1964 | Jackson | 73/862.08 |
| 3,456,485 | 7/1969 | Larson | 73/862.08 X |
| 3,456,486 | 7/1969 | Kross | 73/1 C |
| 4,171,647 | 10/1979 | Herrgen | 73/1 C X |
| 4,328,709 | 5/1982 | Schromm | 73/862.23 |
| 4,404,839 | 9/1983 | Geisler | 73/1 C X |
| 4,485,682 | 12/1984 | Stroezel et al. | 73/862.21 X |
| 4,543,814 | 10/1985 | Heilman | 73/1 C |
| 4,544,039 | 10/1985 | Crane | 73/862.21 X |
| 4,583,411 | 4/1986 | Hales | 73/1 C X |

Primary Examiner—Tom Noland
Attorney, Agent, or Firm—Richard W. Carpenter

[57] ABSTRACT

A combination torque tool and torque tool analyzer that includes a housing and a portable tool that can be mounted on the housing. The housing has a control panel with indicator lights and control buttons on an upper surface thereof and contains inside it a torque transducer and torque level alarm circuitry. The portable tool can be used as a torque tool, such as a screwdriver, or a torque tool analyzer.

14 Claims, 2 Drawing Sheets

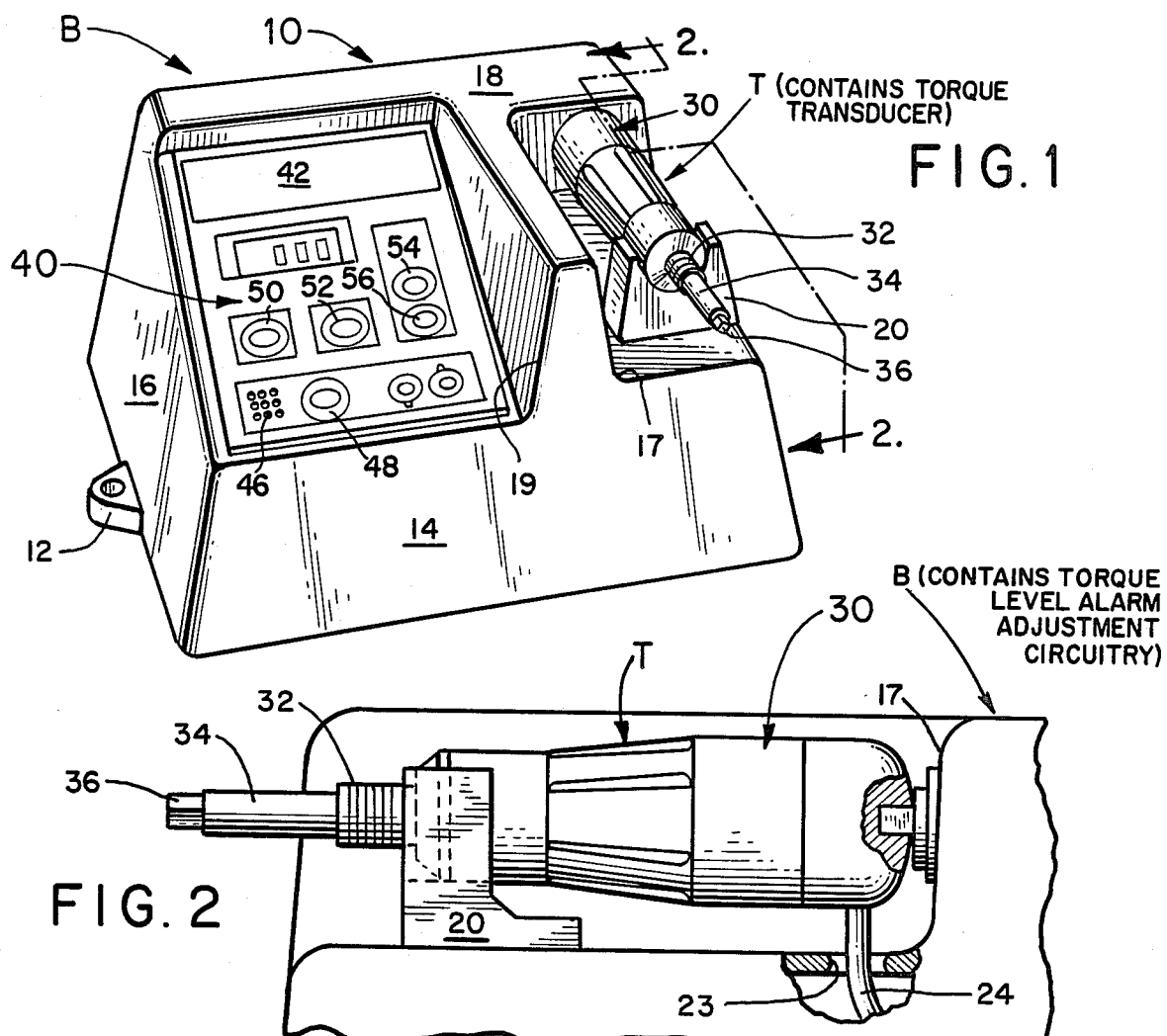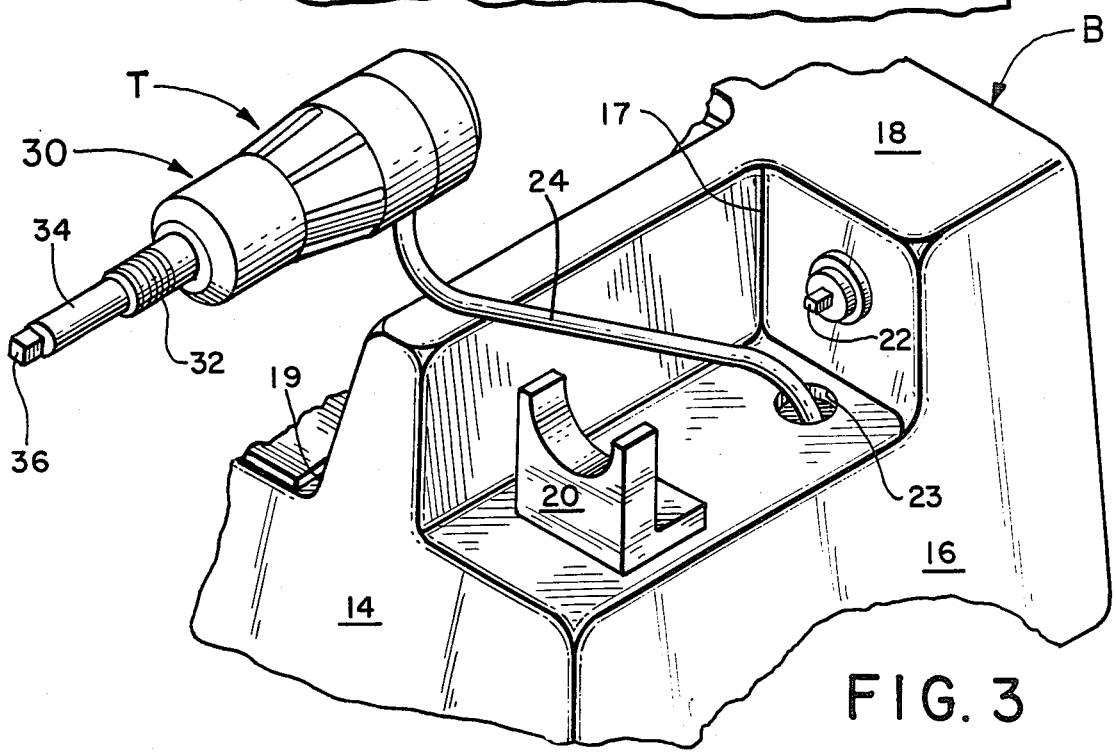

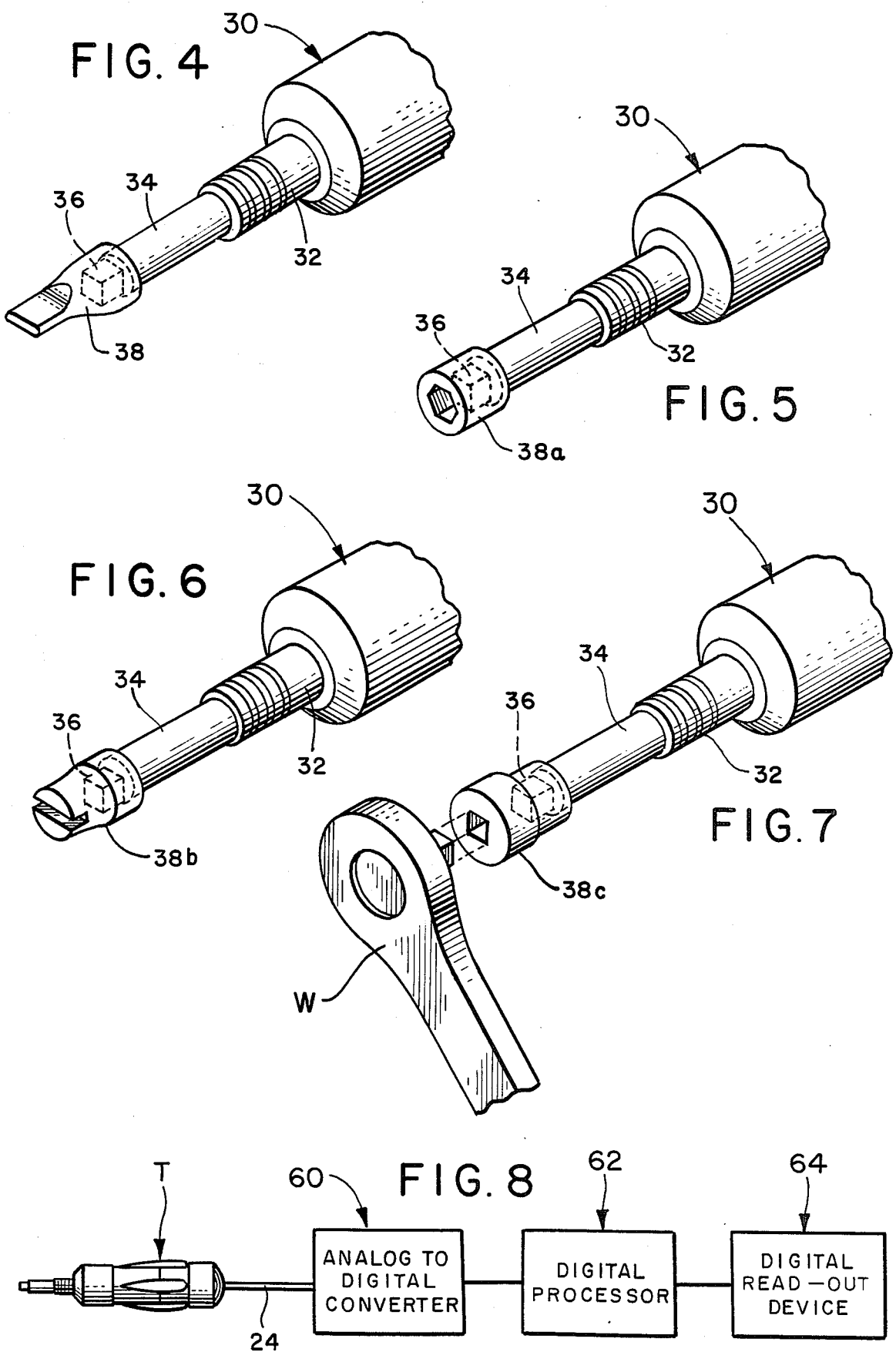

TORQUE TOOL AND TORQUE TOOL ANALYZER

BACKGROUND OF THE INVENTION

1. Field of the Invention

This invention relates to torque tools and torque testing or analyzing devices, and more particularly to a device that can be used alternately as a torque screw driver, torque wrench, or torque tool analyzer.

2. Description of Background Art

A background art search directed to the subject matter of this application in the United States Patent and Trademark Office disclosed the following U.S. Pat. Nos.:

| | | | |
|---|---|---|---|
| 2,503,649 | 2,849,879 | 2,978,898 | 3,456,486 |
| 4,171,647 | 4,328,709 | 4,404,839 | 4,485,682 |
| 4,543,814 | 4,544,039 | 4,583,411 | |

None of the patents uncovered in the search discloses a combination torque tool and torque tool analyzing device that includes a stationary member containing the working components of the device and a portable tool member that can be used as a torque tool, either a screwdriver or a wrench, and, when mounted on the stationary member, can be used as a torque tool analyzing device.

SUMMARY OF THE INVENTION

It is an object of the invention to provide a device which can be used as either a torque tool, such as a screwdriver or wrench, or as a torque tool analyzing device to test or analyze the accuracy of another torque tool, such as a screwdriver or wrench.

A more specific object of the invention is a provision of a combination torque tool and torque tool analyzing device that includes a stationary base member and a portable tool member which, when not mounted on the base member can be used as a torque screwdriver or wrench, and, when mounted on the base member, can be used as a torque tool analyzing device for testing the accuracy of other torque screwdrivers or wrenches.

These and other objects of the invention will be apparent from an examination from the following description and drawings.

BRIEF DESCRIPTION OF THE DRAWINGS

FIG. 1 is an isometric view of a combination torque tool and torque tool analyzing device embodying features of the invention;

FIG. 2 is an enlarged, partial side elevational view of the structure illustrated in FIG. 1, with portions of the structure shown in vertical section, taken along line 2—2 of FIG. 1;

FIG. 3 is an enlarged, fragmentary, isometric view of the structure illustrated in FIG. 1, but as seen from a different angle and shown with the portable tool member removed from the stationary base member.

FIG. 4 is an enlarged isometric view of a portion of the tool member illustrated in the other views, but shown with one particular adapter device attached to the end of the shaft, so the tool member can be used as a screwdriver;

FIG. 5 is a view similar to FIG. 4, but shown with the tool member attached to another adapter, so the tool member can be used as a wrench;

FIG. 6 is a view similar to FIG. 5, but shown with the tool member attached to another adapter, so the tool member can be used as a torque screwdriver tester;

FIG. 7 is a view similar to FIG. 6, but shown with the tool member attached to another adapter, so the tool member can be used as a torque wrench tester; and FIG. 8 is a schematic diagram illustrating the computer type components necessary to provide the control and measurement of torque.

It will be understood that, for purposes of clarity, certain elements may have been intentionally omitted from certain views where they are believed to be illustrated to better advantage in other views.

DESCRIPTION OF THE PREFERRED EMBODIMENT

Referring now to the drawings for a better understanding of the invention, and particularly to FIGS. 1-3, it will be seen that the invention includes a portable tool and tool analyzer member, indicated generally at T, and a stationary control unit or base or member, indicated generally at B. The tool member T may be affixed to the base, as seen in FIG. 1, so it can be used as a torque tool analyzing device, or it may separated from the base, as shown in FIG. 3, so that it can be used as a torque tool such as a screwdriver or wrench.

Still referring to FIGS. 1-3, it will be seen that Base B includes a stationary housing 10 having a pair of mounting lugs 12 (one of which is not shown) that may be used to secure the housing to a deck or platform.

Housing 10 includes a front wall 14, a rear wall (not shown) a pair of side walls 16, and a generally T-shaped top wall 18. The top wall is generally T-shaped because the upper portion of housing 10 is provided on opposite sides thereof with a pair of recesses 17 and 19. Recess, 17 as described later in the specification, is adapted to hold the tool member T; whereas recess 19 is adapted to hold a control panel 40.

As best seen in FIG. 3, housing 10 includes a mounting bracket or cradle 20, for holding tool member T when it is mounted on the base for use as an analyzer. The housing also includes a forwardly projecting stud 22 adapted to be received within a complementary opening of the tool member, as hereinafter described, for stabilizing the tool and preventing its movement when it is being used as an analyzer. The tool member may be connected by means of an umbilical cord or cable 24 which extends from the tool member through an opening 23 in the housing 10.

Still referring to FIGS. 2 and 3, it will be seen that the portable tool member includes a generally cylindrical body 30 within which is positioned a transducer (not shown), the purpose of which is described later herein. Projecting axially from the forward end of body 30 is a shaft 34, which is connected to the body by reversing clutch 32, which permits the the shaft to be rotated in either direction.

Shaft 34 is provided with a square stud like end 36 adapted to be connected to any one of several adapter fittings such as the adapter fitting 38, shown in FIG. 4, which permits the tool member to be used as a screwdriver.

In FIG. 5 there is shown another adapter 38a which permits the tool to be used as a torque wrench. In FIGS. 6 and 7 the shaft is fitted with other adapters 38b and 38c, respectively, to permit the tool to be used as an analyzer for a torque screwdriver or torque wrench.

In the other recess 19 of housing 10 there is provided a sloping control panel 40 which includes an LED or LCD display screen 42, holes 46 for the sound of an alarm to come through the housing, an alarm set button 48, a torque peak hold button 50, a reset button 52, and a conversion button 54, which makes it easy to change the readings on the digital display from inch pounds to inch ounces, or to Nm, or to cmkg. The control panel also contains a print button 56 for operating a printer when an associated printer is used.

The essential components of the control unit are: an analog-to-digital converter 60, a digital processor 62, and a read out device 64. The converter and processor are preferably located within housing 10, but could be located outside the housing, if desired. Also included is circuitry (not shown) for adjusting the alarm so that it will be actuated when a predetermined torque level is reached.

The digital read out device may be a liquid crystal display, a light emitting diode display, or some other type, which is located in the display screen of the control panel.

Other components of the control unit preferably contained within housing 10, which are conventional (not shown), may include: a circuit board, a battery, a transformer, an on/off reset fuse, a computer connecter, an alarm, and such other related components as may be necessary.

In the operation of the device, a predetermined torque level or peak is set on the control panel, either with or without the alarm. When the tool member is being used, either as a tool or an analyzer, the torque force on shaft 32 is converted by the transducer in the tool member body an to electrical analog signal and then carried by the cable to the analog-to-digital converter 60, in the housing 10, which converts the signal from analog to digital form for utilization by the digital processor.

The digital processor 62, which is connected (not shown) between the converter and a digital read out device 64 on the display screen 40, converts the digital signals received from the converter to operational instructions for the read out device. The read out device 64 will then operate to provide a visual indication of the torque measured by the transducer in tool member T.

Thus, it will be appreciated that the invention combines into one device a tool member, which can be used as either a torque screwdriver or a torque tester, and a base, containing the working components of the unit, which can be used to mount the tool member so that the tool member can be used as a testing or analyzing device to record the torque of another torque tool.

What is claimed is:

1. A combination torque tool and torque tool analyzer device comprising:
    (a) a portable tool member capable of functioning selectively and alternatively as a torque tool and torque tool analyzer, including:
        (i) a body having, at one end thereof, an axially projecting shaft adapted to engage one of a plurality of different adapter fittings, and having, at the other end thereof, means for connecting said tool body to a stabilizing means:
        (ii) transducer means in said body for converting mechanical energy in the form of torque to electrical energy in the form of analog signals;
    (b) signal conductor means for extending said analog signals from said tool transducer;
    (c) a digital readout device;
    (d) a control unit including:
        (i) a stationary housing member having means for cradling and stabilizing said tool member when it is being used as an analyzer;
        (ii) a control and display panel;
    (e) signal processing means including:
        (i) an analog-to-digital converter connected to said signal conductor means, for converting said extended analog signals to digital signals;
        (ii) a digital processer connected between said analog-to-digital converter and said digital readout device for converting said digital signals to operational instructions for said digital readout device.

2. A device according to claim 1, wherein the function of said tool member can be converted from a screwdriver to a wrench by changing an adapter on the end of said tool member shaft.

3. A device according to claim 1, wherein the function of said tool member can be changed from a tool to a tool analyzer by attaching said tool member to said housing cradling and stabilizing means.

4. A device according to claim 1, wherein said housing stabilizing means includes a stationary stud projecting from said housing and receivable within a complementry opening in said other end of said tool member body;

5. A device according to claim 1, wherein signal conductor means comprising an electric cable connected between said tool member and said analog-to-digital converter.

6. A device according to claim 1, wherein said digital read out device includes a plurality of light emitting diodes.

7. A device according to claim 1, wherein said digital readout device is a liquid crystal display.

8. A device according to claim 1, wherein said digital readout device is in the control panel on said housing.

9. A device according to claim 1, wherein said housing member includes mounting means for securing it to a stationary platform.

10. A device according to claim 1, wherein said control unit includes an alarm and means for adjusting said alarm to be actuated when a predetermined torque level is reached.

11. A device according to claim 1, wherein said signal processing means is located within said housing member.

12. A device according to claim 1, wherein said tool member include a reversing clutch.

13. A combination torque tool and torque tool analyzer device comprising:
    (a) a portable tool member capable of functioning selectively and alternatively as a torque screwdriver, torque wrench, and torque tool analyzer, including:
        (i) a body having, at one end thereof, an axially projecting shaft adapted to engage one of a plurality of different adapter fittings, and having, at the other end thereof, an opening;
        (ii) transducer means in said body for converting mechanical energy in the form of torque to electrical energy in the form of analog signals;
    (b) a cable for extending said analog signals from said tool transducer;
    (c) a digital readout device;
    (d) a control unit including:

(i) a stationary housing member having a bracket for cradling said member and a stud receivable in said opening of said tool member for stabilizing said tool member when it is being used as an analyzer;
(ii) a control and display panel;
(e) signal processing means located within said housing member and including:
(i) an analog-to-digital converter connected to said cable, for converting said extended analog signals to digital signals;
(ii) a digital processor connected between said analog-to-digital converter and said digital read out device for converting said digital signals to operational instructions for said digital read out device.

14. A combination torque tool and torque tool analyzer device comprising:
(a) a portable tool member capable of functioning selectively and alternatively as a torque screwdriver, torque wrench, and torque tool analyzer, including:
(i) a body having, at one end thereof, an axially projecting shaft adapted to engage one of a plurality of different adapter fittings;
(ii) transducer means in said body for converting mechanical energy in the form of torque to electrical energy in the form of analog signals;
(b) means for extending said analog signals from said tool transducer;
(c) a digital readout device;
(d) a control unit including:
(i) a stationary housing member having means for holding said member when it is being used as an analyzer;
(ii) a control and display panel;
(e) signal processing including:
(i) an analog-to-digital converter connected to said signal extending means, for converting said extended analog signals to digital signals;
(ii) a digital processor connected between said analog-to-digital converter and said digital readout device for converting said digital signals to operational instructions for said digital readout device.

* * * * *